US008762335B2

(12) United States Patent
Prahlad et al.

(10) Patent No.: US 8,762,335 B2
(45) Date of Patent: Jun. 24, 2014

(54) SYSTEM AND METHOD FOR STORAGE OPERATION ACCESS SECURITY

(71) Applicant: CommVault Systems, Inc., Oceanport, NJ (US)

(72) Inventors: Anand Prahlad, Bangalore (IN); Srinivas Kavuri, Bangalore (IN)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 13/899,384

(22) Filed: May 21, 2013

(65) Prior Publication Data

US 2013/0254236 A1  Sep. 26, 2013

Related U.S. Application Data

(63) Continuation of application No. 13/250,997, filed on Sep. 30, 2011, now Pat. No. 8,447,728, which is a continuation of application No. 12/058,511, filed on Mar. 28, 2008, now Pat. No. 8,108,427, which is a continuation of application No. 11/694,784, filed on Mar. 30, 2007.

(60) Provisional application No. 60/852,584, filed on Oct. 17, 2006.

(51) Int. Cl.
*G06F 7/00* (2006.01)

(52) U.S. Cl.
USPC ............................. 707/627; 707/785; 726/27

(58) Field of Classification Search
USPC .................................. 707/627, 785; 726/27
See application file for complete search history.

(56) References Cited

U.S. PATENT DOCUMENTS

| 4,296,465 A | 10/1981 | Lemak |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |

(Continued)

FOREIGN PATENT DOCUMENTS

| EP | 02599612 A1 | 3/1988 |
| EP | 0405926 A2 | 1/1991 |

(Continued)

OTHER PUBLICATIONS

U.S. Appl. No. 13/868,320, filed Apr. 23, 2013, Ignatius et al.

(Continued)

*Primary Examiner* — Cheryl Lewis
(74) *Attorney, Agent, or Firm* — Perkins Coie LLP

(57) ABSTRACT

A method and system for controlling access to stored data is provided. The storage access control system leverages a preexisting security infrastructure of a system to inform the proper access control that should be applied to data stored outside of its original location, such as a data backup. The storage access control system may place similar access control restrictions on the backup files that existed on the original files. In this way, the backed up data is given similar protection as that of the original data.

18 Claims, 5 Drawing Sheets

(56) References Cited

U.S. PATENT DOCUMENTS

| | | |
|---|---|---|
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo et al. |
| 5,311,509 A | 5/1994 | Heddes et al. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,598,546 A | 1/1997 | Blomgren |
| 5,619,644 A | 4/1997 | Crockett et al. |
| 5,638,509 A | 6/1997 | Dunphy et al. |
| 5,673,381 A | 9/1997 | Huai et al. |
| 5,683,513 A | 11/1997 | Fujimaki |
| 5,699,361 A | 12/1997 | Ding et al. |
| 5,729,743 A | 3/1998 | Squibb |
| 5,751,997 A | 5/1998 | Kullick et al. |
| 5,752,041 A | 5/1998 | Fosdick |
| 5,758,068 A | 5/1998 | Brandt et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,778,395 A | 7/1998 | Whiting et al. |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,860,104 A | 1/1999 | Witt et al. |
| 5,875,478 A | 2/1999 | Blumenau |
| 5,887,134 A | 3/1999 | Ebrahim |
| 5,901,327 A | 5/1999 | Ofek |
| 5,903,646 A | 5/1999 | Rackman |
| 5,924,102 A | 7/1999 | Perks |
| 5,950,205 A | 9/1999 | Aviani, Jr. |
| 5,956,519 A | 9/1999 | Wise et al. |
| 5,970,233 A | 10/1999 | Liu et al. |
| 5,970,255 A | 10/1999 | Tran et al. |
| 5,974,563 A | 10/1999 | Beeler, Jr. |
| 5,999,629 A | 12/1999 | Heer et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,094,684 A | 7/2000 | Pallmann |
| 6,105,129 A | 8/2000 | Meier et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,169,976 B1 | 1/2001 | Colosso |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,381,331 B1 | 4/2002 | Kato et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,577,734 B1 | 6/2003 | Etzel et al. |
| 6,604,149 B1 | 8/2003 | Deo et al. |
| 6,654,825 B2 | 11/2003 | Clapp et al. |
| 6,658,526 B2 | 12/2003 | Nguyen et al. |
| 6,757,680 B1 | 6/2004 | Choy |
| 6,772,332 B1 | 8/2004 | Boebert et al. |
| 6,898,286 B2 | 5/2005 | Murray |
| 6,973,621 B2 | 12/2005 | Sie et al. |
| 7,035,880 B1 | 4/2006 | Crescenti et al. |
| 7,130,970 B2 | 10/2006 | Devassy et al. |
| 7,209,972 B1 | 4/2007 | Ignatius et al. |
| 7,213,269 B2 | 5/2007 | Orthlieb et al. |
| 7,277,941 B2 | 10/2007 | Ignatius et al. |
| 7,287,045 B2 | 10/2007 | Saika et al. |
| 7,287,047 B2 | 10/2007 | Kavuri |
| 7,315,923 B2 | 1/2008 | Retnamma et al. |
| 7,320,068 B2 | 1/2008 | Zimniewicz et al. |
| 7,328,189 B2 | 2/2008 | Ling |
| 7,360,252 B1 | 4/2008 | Torrubia-Saez et al. |
| 7,389,273 B2 | 6/2008 | Irwin et al. |
| 7,395,282 B1 | 7/2008 | Crescenti et al. |
| 7,401,154 B2 | 7/2008 | Ignatius et al. |
| 7,506,102 B2 | 3/2009 | Lev-Ran et al. |
| 7,519,827 B2 | 4/2009 | Anderson et al. |
| 7,581,077 B2 | 8/2009 | Ignatius et al. |
| 7,620,976 B2 | 11/2009 | Low et al. |
| 7,627,569 B2 | 12/2009 | Gafter |
| 7,627,776 B2 | 12/2009 | Petruzzo |
| 7,702,693 B1 | 4/2010 | Aiyagari et al. |
| 7,739,381 B2 | 6/2010 | Ignatius et al. |
| 7,748,027 B2 | 6/2010 | Patrick |
| 7,761,713 B2 | 7/2010 | Baar |
| 7,782,742 B2 | 8/2010 | Park |
| 7,805,600 B2 | 9/2010 | Bucher et al. |
| 7,818,262 B2 | 10/2010 | Kavuri et al. |
| 7,840,537 B2 | 11/2010 | Gokhale et al. |
| 7,882,315 B2 | 2/2011 | Tsai et al. |
| 7,926,087 B1 | 4/2011 | Holl, II et al. |
| 8,108,427 B2 | 1/2012 | Prahlad et al. |
| 8,131,648 B2 | 3/2012 | Barton |
| 8,140,786 B2 | 3/2012 | Bunte et al. |
| 8,165,221 B2 | 4/2012 | Zheng et al. |
| 8,200,191 B1 | 6/2012 | Belser et al. |
| 8,219,524 B2 | 7/2012 | Gokhale |
| 8,447,728 B2 * | 5/2013 | Prahlad et al. ............. 707/627 |
| 2002/0007347 A1 | 1/2002 | Blumenthal et al. |
| 2002/0007351 A1 | 1/2002 | Hillegass et al. |
| 2002/0077988 A1 | 6/2002 | Sasaki et al. |
| 2002/0120726 A1 | 8/2002 | Padole et al. |
| 2002/0128976 A1 | 9/2002 | O'Connor et al. |
| 2002/0147734 A1 | 10/2002 | Shoup et al. |
| 2002/0174011 A1 | 11/2002 | Sanchez et al. |
| 2003/0005428 A1 | 1/2003 | Roman |
| 2003/0200104 A1 | 10/2003 | Heming et al. |
| 2004/0093229 A1 | 5/2004 | Plain |
| 2004/0204949 A1 | 10/2004 | Shaji et al. |
| 2004/0210509 A1 | 10/2004 | Eder |
| 2004/0249759 A1 | 12/2004 | Higashi et al. |
| 2004/0255143 A1 | 12/2004 | Wemyss et al. |
| 2004/0260565 A1 * | 12/2004 | Zimniewicz et al. ............. 705/1 |
| 2005/0004951 A1 | 1/2005 | Ciaramitaro et al. |
| 2005/0027657 A1 | 2/2005 | Leontiev et al. |
| 2005/0091655 A1 | 4/2005 | Probert et al. |
| 2005/0097440 A1 | 5/2005 | Lusk et al. |

(56) References Cited

U.S. PATENT DOCUMENTS

| | | | |
|---|---|---|---|
| 2005/0108526 | A1 | 5/2005 | Robertson |
| 2006/0224846 | A1 | 10/2006 | Amarendran et al. |
| 2006/0242296 | A1 | 10/2006 | Woolard et al. |
| 2006/0242558 | A1 | 10/2006 | Racovolis et al. |
| 2007/0050362 | A1 | 3/2007 | Low et al. |
| 2007/0057958 | A1* | 3/2007 | Bucher et al. .............. 345/568 |
| 2007/0198421 | A1 | 8/2007 | Muller et al. |
| 2007/0198422 | A1 | 8/2007 | Prahlad et al. |
| 2008/0005380 | A1 | 1/2008 | Kawasaki et al. |
| 2008/0091747 | A1 | 4/2008 | Prahlad et al. |
| 2008/0243795 | A1 | 10/2008 | Prahlad et al. |
| 2008/0307020 | A1 | 12/2008 | Ko et al. |
| 2008/0320319 | A1 | 12/2008 | Muller et al. |
| 2009/0222907 | A1 | 9/2009 | Guichard |
| 2009/0319534 | A1 | 12/2009 | Gokhale |
| 2009/0319585 | A1 | 12/2009 | Gokhale |
| 2010/0031017 | A1 | 2/2010 | Gokhale et al. |
| 2010/0242096 | A1 | 9/2010 | Varadharajan et al. |
| 2010/0313039 | A1 | 12/2010 | Ignatius et al. |
| 2012/0023140 | A1 | 1/2012 | Prahlad et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0862304 A2 | 9/1998 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

U.S. Appl. No. 13/874,358, filed Apr. 30, 2013, Varadharajan et al.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1986-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

CommVault Systems, Inc., "QiNetix Books Online Documentation," submitted on CD-ROM, released Dec. 2005.

CommVault, "Firewall Considerations—How To," <http://documentation.commvault.com/commvault/release_8_0_0/books_online_1/english_us/features/firewall/firewall_how_to.htm>, internet accessed on Feb. 27, 2009, 11 pages.

CommVault, "Firewall Considerations,"<http://documentation.commvault.com/commvault/release_8_0_0/books_online_1/english_us/features/firewall/firewall.htm>, internet accessed on Feb. 27, 2009, 8 pages.

Eitel, "Backup and Storage Management in Distributed Heterogeneous Environments," *IEEE*. 1994, pp. 124-126.

Jander, M., "Launching Storage-Area Net,"*Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1986) (see inparticular figure 5 in p. 15 and recitation in claim 5).

Kwok, S. H., Digital rights management for the online music business, SIGecom Exch. 3, 3 (Jun. 2002), available at <http://doi.acm.org/10.1145/844339.844347>, 8 pages.

Microsoft SQL Server Documentation, "Adding a Member to a Pre-defined Role," 2000.

Microsoft SQL Server Documentation, "Adding a Member to a SQL Server Database Role," 2000.

Microsoft SQL Server Documenatation, "Adding a Windows User or Group," 2000.

Microsoft SQL Server Documentation, "Authentication Modes," 2000.

Microsoft SQL Server Documentation, "Creating User-Defined SQL Server Database Roles," 2000.

Microsoft SQL Server Documentation, "Granting a Windows User or Group Access to a Database," 2000.

Microsoft SQL Server Documentation, "Security Architecture," 2000.

Rosenblum et al., "The Design and Implementation of a Log-Structured File System," *Operating Systems Review SIGOPS*, vol. 25, No. 5, New York, US, pp. 1-15 (May 1991).

White, R. "How Computers Work", Sixth Edition, Que Corporation, Jun. 26, 2002, 7 pages.

\* cited by examiner

SYSTEM AND METHOD FOR STORAGE OPERATION ACCESS SECURITY

CROSS-REFERENCE TO RELATED APPLICATIONS

The present application is a continuation of U.S. application Ser. No. 13/250,997 entitled "SYSTEMS AND METHOD FOR STORAGE OPERATION ACCESS SECURITY" and filed on Sep. 30, 2011, now U.S. Pat. No. 8,447,728, which is a continuation of U.S. application Ser. No. 12/058,511 entitled "SYSTEM AND METHOD FOR STORAGE OPERATION ACCESS SECURITY" and filed on Mar. 28, 2008, now U.S. Pat. No. 8,108,427, which is a continuation of U.S. application Ser. No. 11/694,784 entitled "SYSTEM AND METHOD FOR STORAGE OPERATION ACCESS SECURITY" and filed on Mar. 30, 2007, which claims priority to U.S. Provisional Application No. 60/852,584 entitled "METHOD AND SYSTEM FOR COLLABORATIVE SEARCHING," and filed on Oct. 17, 2006, each of which is hereby incorporated by reference.

BACKGROUND

Traditional security systems operate on the principal of limiting access to data. Each user of the system is generally identified with a user name, and access rights are assigned to each user. For example, users may be permitted or prevented from accessing certain files or adding new hardware to a computer system. Users may also be assigned to groups where each member of the group is given common access rights. Often a great amount of administrative effort has been put into creating users and groups and assigning them appropriate access rights in a traditional computer security system. For example, Microsoft Windows provides Active Directory for creating users and groups and assigning access to resources throughout a computer network. File systems also often provide access control. For example, the NT File System (NTFS) provides folder and file access based on user and group identifiers and the type of access requested such as read, write, execute, and other operations. An organization may have an extensive scheme of groups and access rights. For example, there may be a group of accounting department users that have different rights than engineering department users. The organization may also have identified certain users as administrators that have additional rights to administer the system.

Computer systems contain large amounts of personal data, such as financial data, names, addresses, telephone numbers, bank account information, photographs and much more. Corporate computer systems often contain confidential information, such as trade secrets, manufacturing processes, business strategy, and so on. With the increased reliance on computer systems to store critical information, the importance of protecting this data against loss has grown. For example, traditional storage management systems receive an identification of a file location of an original file and then create one or more secondary copies, such as backup files, containing the contents of the original file. These secondary copies can then later be used to restore the original data should anything happen to the original data. Secondary copies of data are often stored in a publicly accessible location for quick restoration of data in the event of a disaster or other data loss event. For example, backup files may be stored on a widely accessible server, and tapes and other media used for storing backup files may be physically accessible to many users.

Backed up data may contain sensitive information that is more widely accessible than the original data. Backing up data often removes the data from the well-planned security environment in which it was originally stored. Even though a system administrator may have gone to great lengths to properly limit access to data throughout a network, once the data is stored as one or more secondary copies it is often more accessible than originally intended. For example, the CEO of a company may have many sensitive files on a computer system that only he can access, but if that computer system is backed up, then the backup files may allow unauthorized users to have access to data that they would not normally be able to access. In addition, some systems provide searches based on backup data in which the backup data is indexed. Indexed content does not have the protections imposed on the original files.

There is a need for a system that overcomes the above problems, as well as providing additional benefits.

Figure 1:
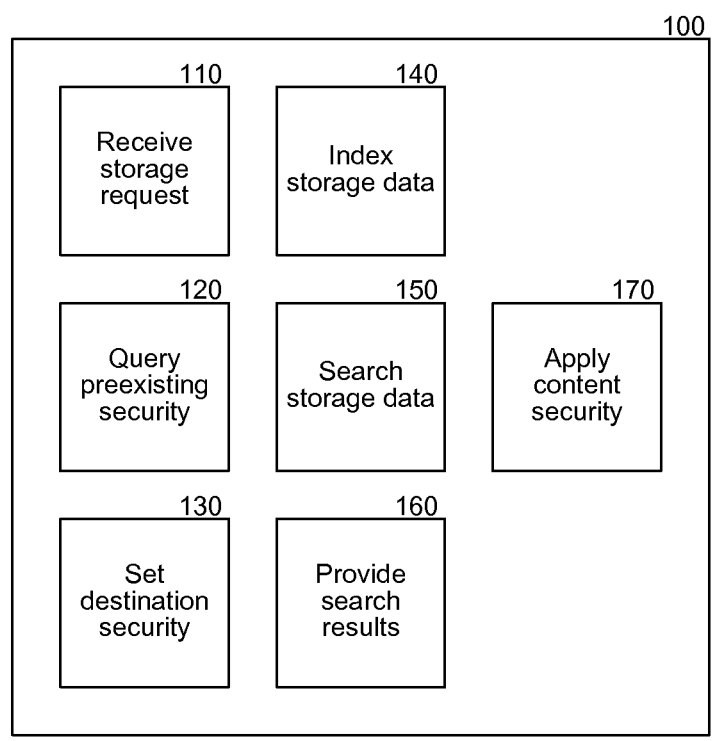
FIG. 1 is a block diagram that illustrates components of a storage access control system in one embodiment.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 110 is first introduced and discussed with respect to FIG. 1).

The headings provided herein are for convenience only and do not necessarily affect the scope or meaning of the claimed invention.

DETAILED DESCRIPTION

Overview

A method and system for controlling access to stored data described below leverages a preexisting security infrastructure to inform proper access control that should be applied to data stored outside of its original location, such as a data backup. In one embodiment, the storage access control system receives a request to perform a storage operation that makes data at a source location available at a destination location. For example, the request may indicate that data stored on one computer should be copied and stored on a second computer. A storage operation may include many types of operations such as backup, migration, replication, snapshot, hierarchical storage management (HSM), and so on. For example, the storage operation may be a request to make a snapshot copy of data at the source location. The source location may contain electronic information such as file system data objects, application data objects, or other types of storage data objects. Upon receiving the request, the storage access control system queries the source or other location for access control information. For example, if the data includes one or more files, then the storage access control system may examine the file system to determine what access control scheme is currently in place for the data. The file system may contain access information that identifies the users and groups that have access to the data. One manner in which the access information may be associated with the data is by storing the access information along with the file. Then, the storage access control system applies the access control information to the data stored at the destination location. For example, the storage access control system may associate the access control information with the data stored at the destination location in a different manner, such as by storing metadata describing the access control information in a content indexing system. In the example of backing up files, the storage access control system may place similar access control restrictions on the backup files that existed on the original files. In this way, the backed up data is given similar protection as that of the original data.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Improving Security with ACLs and Active Directory

In some embodiments, the storage access control system determines the access control information stored by the preexisting security infrastructure based on an offline or secondary copy of the data. An offline copy can be a backup, snapshot, or other copy of the data that is not actively being used by a live data server or other computers system. By using a secondary copy, the storage access control system can avoid interrupting user access to the live data by not consuming additional resources on the server or other computer system storing the live copy of the data.

When a live or production copy of the source data is used to create a secondary copy, the preexisting security information associated with the data may also be associated with the secondary copy. For example, if the source data is a file, then the security information associated with the file may be captured when the secondary copy is created and stored with the file or in another location that is associated with the secondary copy. For example, many file systems contain hierarchical security schemes such that access control information applied to a parent file system object (e.g., a folder) is applied to each of the child file system objects (e.g., files in the folder). The storage access control system captures this information so that the access control information applied to source data can also be applied to secondary copies of the source data. For example, if the user later performs a search and the storage access control system searches offline copies of data, then the storage access control system can ensure that the user has similar access (both permitting allowed operations and denying excluded operations) to the offline data that the user had to the original live data from which the offline data was created. For example, if the user could not browse particular source data, then the storage access control system may exclude references to secondary copies of the source data from search results. Similarly, if the user could browse and read a file but not write to it, then the storage access control system may permit the user to receive the file in search results, read from the file, but not make modifications to the file.

In some embodiments, the storage access control system stores access control information as metadata that identifies users or groups authorized to perform storage operations. For example, backup files may contain metadata that lists the users that can access the data contained in the backup file. Alternatively or additionally, backup data that is indexed for searching may be associated with metadata stored with the index to apply access control information in response to search queries. For example, a user that does not have permission to access a particular backup data object may be prevented from receiving that data object in a list of results from a search query, even though the backup data object may satisfy the search criteria. Alternatively or additionally, the user may be able to receive the data object in a list of search results, but not be able to open or view the data object. A data object could be a file system object (e.g., a file or folder), an application data object (e.g., an email mailbox, word processing document, etc.), or other object containing data.

In some embodiments, the storage access control system stores access control information as an Access Control List (ACL) containing Access Control Entries (ACE). The ACL contains a list of users and/or groups that are allowed to access a data object, type of data object, or resource containing a data object. Each ACE may specify a user, group, or other entity that has access to the data object associated with the ACL. In some embodiments, an ACL may contain a list of users or groups that are specifically denied access to a data object. In this way, administrators can apply access control rights in the manner that is most logical for their organization. For example, if everyone in the accounting department except User A should have access to a particular data object, then an administrator may create an ACL associated with the data object containing an ACE that allows access to the accounting department group, and another ACE that denies access to User A. The ACL may also contain Boolean operators that describe combinations of permissions and users that should be applied to a data object.

When a user, system, or process attempts to access a data object, such as to perform a storage operation on the data object, the storage access control system accesses the ACL and associated ACEs related to the data object to determine whether the user has the appropriate access to perform the operation on the data object. If the user has the appropriate access, then permission to perform the operation is granted, and the operation proceeds. If the user does not have the appropriate access, then the storage access control system denies permission to perform the operation, and an error or other information may be conveyed to the user indicating that the operation was not performed.

In some embodiments, the storage access control system further protects secondary copies of data, such as by encrypting the data. This may be useful when the backup data is expected to be stored offsite, such as by a public remote backup provider. The data may be encrypted such that it can only be decrypted by those users or groups with access to the original data. For example, the data may be encrypted using a key that is associated with a particular group of users that has access to the data. Users that are not part of the group will not know or be associated with the key and therefore will not be able to decrypt the data, while users within the group will know the key and can decrypt and access the data.

In some embodiments, the storage access control system assigns access rights based on the content of or metadata associated with a data object, such as by querying a content or metadata indexing system. For example, some users may be denied access to files that contain the word "confidential." An access group of company executives can be granted exclusive access to files that contain the term "board of directors." The system may apply such content filtering to the data directly, or the system can filter searches for data objects such that the search results do not contain content to which the searching user has not been granted the right to access.

Active Directory Integration for User Creation

In some embodiments, the storage access control system provides a separate security infrastructure, but recognizes users and groups created in the preexisting security infrastructure. For example, server systems running Microsoft Windows often use Active Directory or other systems to create users and groups and assign access rights to those users and groups. The storage access control system may allow creating a separate set of users and groups that are assigned various storage operation rights. However, rather than recreating each user from the Active Directory in the storage access control system, the storage access control system may allow adding an Active Directory user or group to a storage access control system group. For example, when an Active Directory user is added to a storage access control system group, the storage access control system may query the Active Directory to determine information about the user and the access rights associated with the user. Thus, it is not necessary to give storage system operators permissions to create new storage access control system users, and it is not necessary to duplicate the users in both security systems. Similarly, other preexisting security infrastructures could be used with the storage access control system.

The storage access control system may also retrieve other information from the preexisting security system. For example, the preexisting security system may maintain a list of computers associated with a particular user, and the storage access control system can grant the user access, for example, to backup computers in that list. The preexisting security system may contain other supplemental information, such as the user's email address that the storage access control system may use, for example, to email the user if a storage operation fails. The integration and connection of the storage access control system with the preexisting security system allows the storage access control system to provide a system administrator with additional value in the administrator's investment of time and resources in the preexisting security system and reduces the need for a redundant investment of time and resources in another security system.

Security-Based Queries and Access Filtering

In some embodiments, the storage access control system provides an indexing and search facility that allows searching based on keywords within backed up documents. The storage access control system stores access control information for indexed files and applies access control to search queries initiated by a user, system, or process. For example, an administrator may be able to search backup data for all users, whereas another user may only be able to search her own backup data. Likewise, an executive of a company may be able to search for and view content containing sensitive business plans or trade secrets, but other employees may not.

Such access control may be applied using ACLS and Active Directory groups as described above. For example, a user with an ACL on an original file that allows the user to view the file can also view search results containing the file, whereas a user without access to the original file cannot view the file by opening it from a list of search results. Similarly, a user that is a member of an Active Directory group that has access to a file will have access to view search results containing the file. In this way, an organization can leverage the investment in an existing security infrastructure to provide similar security for content accessible via a search facility.

Figures

Unless described otherwise below, aspects of the invention may be practiced with conventional systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 (or other embodiments or Figures) based on the detailed description provided herein.

FIG. 1 is a block diagram that illustrates components of the storage access control system in one embodiment. The storage access control system 100 contains a receive storage request component 110, a query preexisting security component 120, a set destination security component 130, an index storage data component 140, a search storage data component 150, a provide search results component 160, and an apply content security component 170. The receive storage request component 110 handles incoming storage requests. For example, a storage request may include a request to copy data from a source location to a destination location. The query preexisting security component 120 queries access control information from an existing security provider external to the storage access control system. For example, files stored in an NTFS file system contain or are otherwise associated with access control information that specifies the users that are allowed to access the file.

The set destination security component 130 applies access control information identified from an external security provider to data managed by the storage access control system. For example, during a backup operation, access control information from a source file is associated with secondary copies that store information from the source file, such that a user has similar access rights to the source file and the backup data. The index storage data component 140 creates an index of storage data managed by the storage access control system. For example, the system 100 can maintain an index of data present in a set of files that have been backed up.

The search storage data component 150 performs searches of indexed storage data to identify matching data objects. The provide search results component 160 prepares identified matching data objects for display to a user. For example, data objects for which the searching user does not have access rights may be removed from the search results before the results are returned to the user. The apply content security component 170 applies security to a data object based on the content of the data object. For example, if a user has not been granted access to documents containing the word "confidential," then the apply content security component 170 prevents the user from accessing a document containing "confidential."

FIG. 1 and the following discussion provide a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Figure 2:
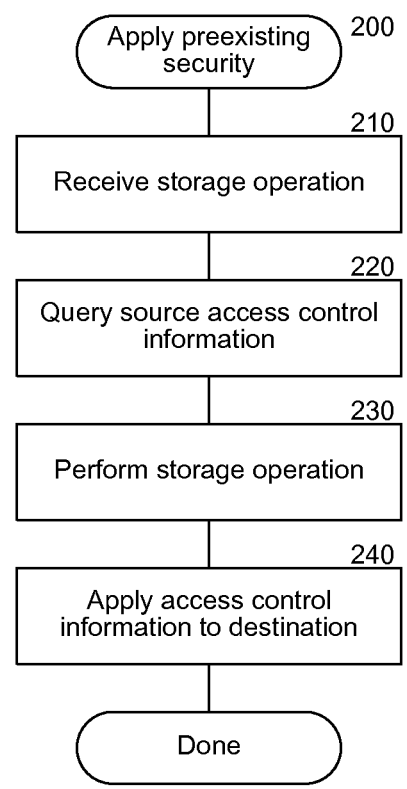
FIG. 2 is a flow diagram that illustrates processing of the system to apply preexisting security to data objects in one embodiment.
Figure 3:
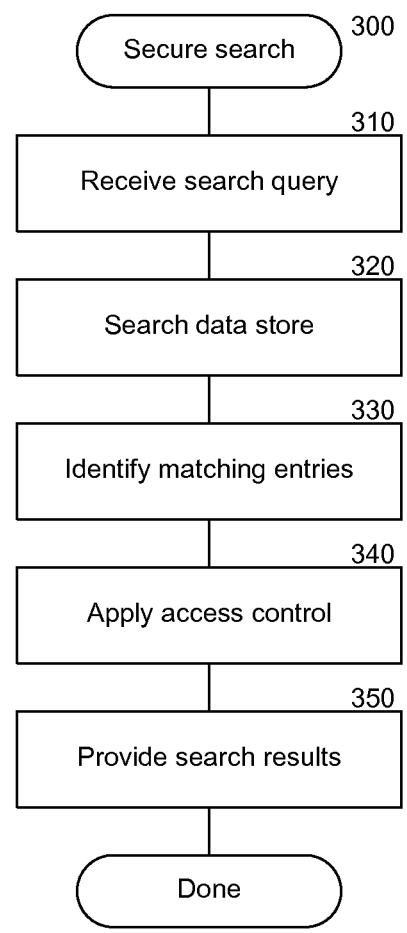
FIG. 3 is a flow diagram that illustrates processing of the system to perform a secure search in one embodiment.
Figure 4:
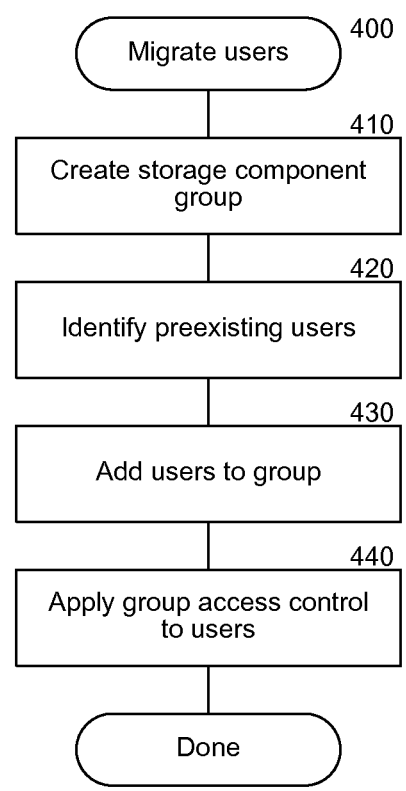
FIG. 4 is a flow diagram that illustrates processing of the system to migrate users from a preexisting security infrastructure to a storage component security infrastructure in one embodiment.

FIGS. 2-4 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 2 is a flow diagram that illustrates the processing of the system to apply preexisting security to data objects in one embodiment. These steps are invoked when a storage operation is performed that results in data being moved or copied from a source location to a destination location. In step 210, the system receives a storage operation, such as a request to copy data from a source location to a destination location. In step 220, the system queries the source location for access control information. For example, if the source information is a file, then the storage access control system queries access control information from the file system. In step 230, if the access control information indicates that the requestor of the storage operation has permission to perform the operation, then the system performs the requested storage operation. For example, if the operation is a backup, then the system backs up data from the source location to the destination location. In step 240, the system applies the access control information to the destination data objects, such as backup files or folders. Access control information captured from a file system may be stored as metadata in a content indexing system that controls access to secondary copies of the source data. For example, ACLs and ACEs associated with files may be stored in the content indexing system or otherwise associated with secondary copies of the files. After step 240, these steps conclude.

FIG. 3 is a flow diagram that illustrates the processing of the system to perform a secure search in one embodiment. These steps are invoked when a user attempts to search for data objects matching specified criteria. In step 310, the system receives a search query specifying the criteria (e.g., of the data objects) for which the user is searching. For example, the criteria may contain a file name or the contents of a file that the user is seeking. In step 320, the system searches one or more data stores or an index of content of the data stores using the received query. The system may only search certain data stores based on the access permitted to the user. The data store may be a destination location where the data objects were copied following a storage operation, or the data store may contain metadata about the data objects, which may be stored elsewhere. In step 330, the system identifies matching data object entries in the data store that satisfy the received search criteria. In step 340, the system applies access control settings to the search results. For example, certain users may not have access to documents from a certain location or containing certain keywords. As another example, the access control information may be used to decrypt an encrypted search result. The system may perform the search in two passes. During the first pass, the system performs a coarse search in which all data stores to which the user has accessed are searched to create a list of search results. During the second pass, a finer grained search of the individual results is performed to determine which search results the user has access to receive. Search results that the user does not have access to receive may be removed or replaced with a no access indicator (e.g., an icon) before the search results are displayed to the user. In step 350, the system provides the search results to the querying user. After step 350, these steps conclude.

FIG. 4 is a flow diagram that illustrates the processing of the system to migrate users or security information associated with users from a preexisting security infrastructure to a storage application (or component) in one embodiment. These steps are invoked when, for example, an administrator manages storage access control for a storage application. In step 410, the system creates a group within the storage application. For example, the administrator may create a group of users called "Backup Users" that have the necessary access rights to perform a backup of certain data within the system. Alternatively, the system may import whole groups from the preexisting security infrastructure and assign access rights to the groups and entities within the groups. In step 420, the system identifies preexisting users that are external to the storage application. For example, an administrator may have previously defined the users in the Windows Active Directory or in another external security component.

In step 430, the system adds the external users to the storage application group, such that the storage application group contains users that were not created using the storage application. For example, a user "Bob Jones" created in the Active Directory may be added to a group "System Administrators" within the storage application. The external users may also be user groups, such that group previously created by the administrator using Windows Active Directory is added to the storage application group. In step 440, the system applies the access control rights of the storage application group to the added external users. The system is more secure than traditional systems because each administrator is not given access to create new users within the storage application. By allowing an administrator to add external users to the storage application, the system does not need to allow most administrators to have the access rights necessary to create new users within the storage application. For example, an administrator may only be able to add existing users or groups to the storage application. Thus, an administrator of the pre-existing security system can restrict the entities to which an administrator of the storage application can assign rights. Storage system administrators often have access to some of a corporation's most important data, so the ability to control which users can perform storage operations can significantly enhance data security. After step 440, these steps conclude.

Figure 5:
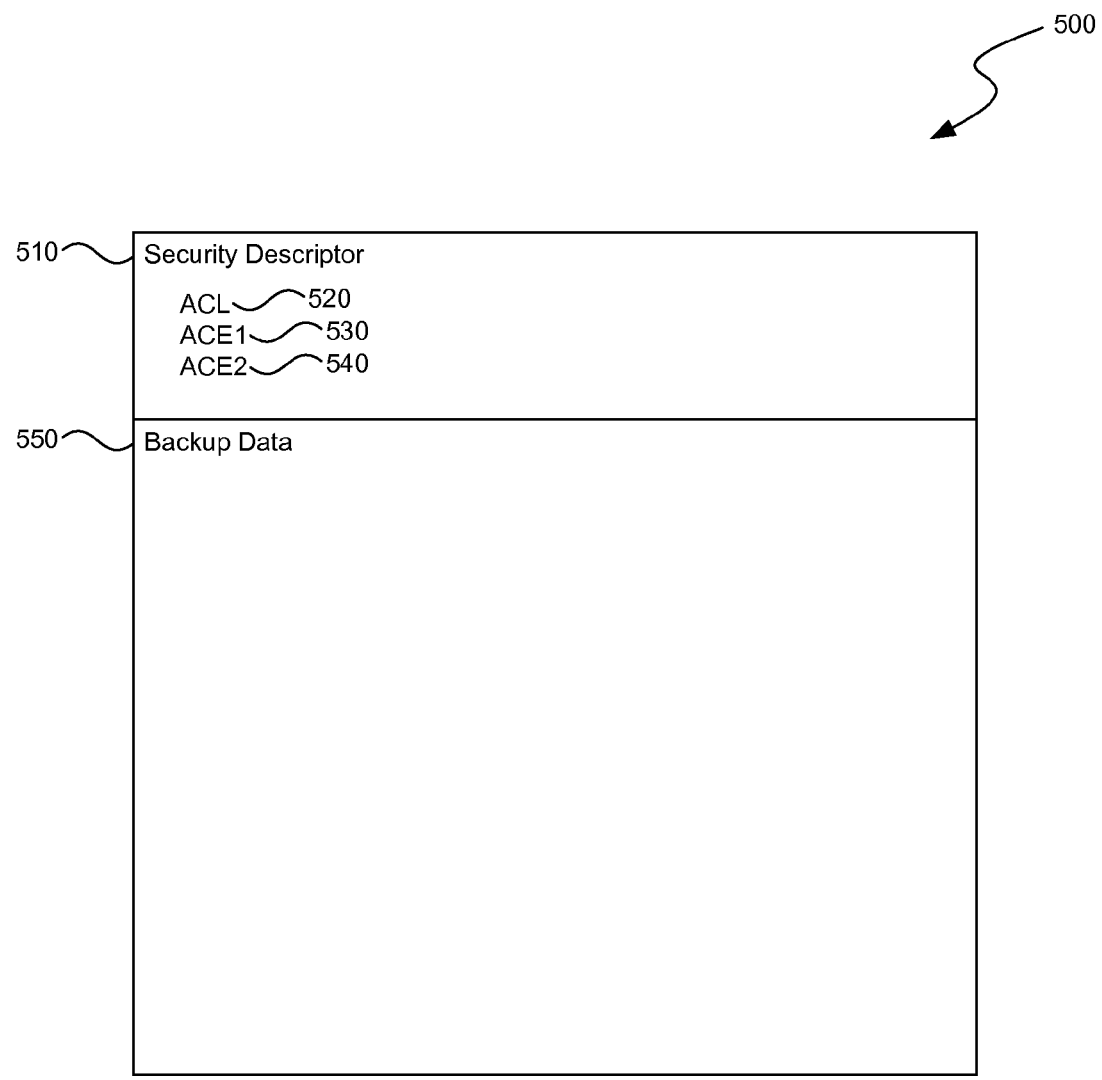
FIG. 5 is a data structure diagram that illustrates storing of access control information with storage data in one embodiment.

FIG. 5 is a data structure diagram that illustrates access control information metadata that may be stored with storage data in one embodiment. The data structure 500 contains a security descriptor 510 and secondary data 550. The security descriptor 510 contains an access control list 520 that specifies the entities that have access to the backup data. The security descriptor 510 may contain multiple access control lists that define different types of access such as read, write, or execute permissions. The access control list 510 contains access control entries ACE1 and ACE2 (shown with respective reference numerals 530 and 540). Each access control entry refers to a different entity, such as a user, group, resource, or other entity, that has some type of access or lack of access to the secondary data 550. Alternatively or additionally, the access control entries 530 and 540 may specify different entries that are denied access to the secondary data 550. The security descriptor 510 may contain other information such as keywords that members of the specified access control list have access rights to. For example, the security descriptor 510 may indicate that a particular entity does not have access to documents containing the keyword "confidential."

CONCLUSION

From the foregoing, it will be appreciated that specific embodiments of the storage access control system have been described herein for purposes of illustration, but that various modifications may be made without deviating from the spirit and scope of the invention. For example, although certain preexisting security systems have been described, the storage access control system is compatible with any preexisting security system, such as Linux Kerberos, Lightweight Directory Access Protocol (LDAP)-based systems, and others. Although backups have been described, the storage access control system can be applied to other storage operations such as migrating data from one system to another. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for execution by at least one processor to manage users in a data management system, wherein the data management system manages secondary copies of data files, the method comprising:

adding a user of the data management system to a previously created group within the data management system,
wherein the group associates one or more users with at least one access right for performing storage operations;

receiving a request from the user to perform a storage operation,
    wherein the storage operation is to create a secondary copy of a production data file;
causing a security system to be queried to determine access rights of the user,
    wherein the access rights relate to the user's rights to access the production data file, and,
causing the requested storage operation to be performed when the access rights permit the user to request the requested storage operation,
    wherein the secondary copy is used to restore production data from the production file from which the secondary copy is created;
    wherein causing the security system to be queried to determine the access rights includes determining one or more computers through which the user has access,
    wherein the access rights permit the data management system to perform the requested storage operation if the production data file is associated with one of the determined one or more computers;
    wherein adding the user to the created group within the data management system includes associating the created group with the user in the security system; and
    wherein the at least one access right for performing storage operations determines which data a user within the group can access.

2. The method of claim 1 wherein a user of the data management system who does not have privileges to create new users within the data management system adds the user to the created group within the data management system, and wherein the secondary storage device is external from and remote to the primary storage.

3. The method of claim 1, further comprising querying the security system to determine an email address associated with the user.

4. The method of claim 1 wherein the user is a security group that contains multiple users and wherein adding an identified at least one user adds all of the users within the group.

5. The method of claim 1 wherein an administrator of the data management system does not have access rights to create new users within the data management system.

6. The method of claim 1 wherein an administrator of the data management system does not have access rights to create new users within the security system.

7. The method of claim 1, further including querying the security system to determine an email address associated with the user such that the email address can be used by the data management system to provide an email update to the user regarding the status of a storage operation.

8. The method of claim 1 wherein adding the identified at least one user to the created group within the data management system comprises storing a reference within the created group to a record associated with the user in the security system.

9. A non-transitory computer-readable medium having instructions for a method of managing users in a data management system that is configured to manage secondary copies of data files, if the instructions are executed by a processor in the data management system, the instructions cause the processor to perform the method, comprising:
    adding a user of the data management system to a previously created group within the data management system,
        wherein the group associates one or more users with at least one access right for performing storage operations;
    receiving a request from the user to perform a storage operation,
        wherein the storage operation is to create a secondary copy of a production data file;
    causing a security system to be queried to determine access rights of the user,
        wherein the access rights relate to the user's rights to access the production data file, and,
    causing the requested storage operation to be performed when the access rights permit the user to request the requested storage operation,
        wherein the secondary copy is used to restore production data from the production file from which the secondary copy is created;
        wherein causing the security system to be queried to determine the access rights includes determining one or more computers through which the user has access,
        wherein the access rights permit the data management system to perform the requested storage operation if the production data file is associated with one of the determined one or more computers;
        wherein adding the user to the created group within the data management system includes associating the created group with the user in the security system; and
        wherein the at least one access right for performing storage operations determines which data a user within the group can access.

10. The computer-readable medium of claim 9 wherein a user of the data management system who does not have privileges to create new users within the data management system adds the user to the created group within the data management system.

11. The computer-readable medium of claim 9, wherein the method further comprises querying the security system to determine an email address associated with the user.

12. The computer-readable medium of claim 9 wherein the user is a security group that contains multiple users and wherein adding an identified at least one user adds all of the users within the group.

13. The computer-readable medium of claim 9 wherein an administrator of the data management system does not have access rights to create new users within the data management system.

14. The computer-readable medium of claim 9 wherein an administrator of the data management system does not have access rights to create new users within the security system.

15. A system for managing users in a data management system that is configured to manage secondary copies of data files, the system comprising:
    means for adding a user of the data management system to a previously created group within the data management system,
        wherein the group associates one or more users with at least one access right for performing storage operations;
    means for receiving a request from the user to perform a storage operation,
        wherein the storage operation is to create a secondary copy of a production data file;
    means for causing a security system to be queried to determine access rights of the user,
        wherein the access rights relate to the user's rights to access the production data file, and, means for causing the requested storage operation to be performed when the access rights permit the user to request the requested storage operation,
- wherein the secondary copy is used to restore production data from the production file from which the secondary copy is created;
- wherein the means for causing the security system to be queried to determine the access rights includes means for determining one or more computers through which the user has access,
- wherein the access rights permit the data management system to perform the requested storage operation if the production data file is associated with one of the determined one or more computers;
- wherein means for adding the user to the created group within the data management system includes means for associating the created group with the user in the security system; and
- wherein the at least one access right for performing storage operations determines which data a user within the group can access.

16. The system of claim 15 wherein a user of the data management system who does not have privileges to create new users within the data management system adds the user to the created group within the data management system.

17. The system of claim 15 further comprising means for querying the security system to determine an email address associated with the user.

18. The system of claim 15 wherein the user is a security group that contains multiple users and wherein adding an identified at least one user adds all of the users within the group.

* * * * *